United States Patent [19]

Williams

[11] 4,040,670

[45] Aug. 9, 1977

[54] METHOD OF MOLDING A SKATE WHEEL HAVING A POLYESTER CORE AND A POLYURETHANE CASE AND THE PRODUCT THEREOF

[75] Inventor: Maurice Charles Williams, Anaheim, Calif.

[73] Assignee: Perma Rain Irrigation, Inc., Lindsay, Calif.

[21] Appl. No.: 651,186

[22] Filed: Jan. 21, 1976

Related U.S. Application Data

[63] Continuation-in-part of Ser. No. 566,792, April 10, 1975, abandoned.

[51] Int. Cl.² .................. B29C 6/00; B29C 27/00; B29D 9/00
[52] U.S. Cl. .................. 301/5.3; 301/63 PW; 156/306; 264/248; 264/250; 264/255; 264/262; 264/271; 264/294
[58] Field of Search .......... 301/5.3, 5.7, 7, 86, 301/63 PW, 108 A; 264/250, 255, 261, 277, 271, 294, 132, 135, 171, 174, 259, 248, 258; 29/132; 156/306; 428/423; 152/7, 323

[56] References Cited

U.S. PATENT DOCUMENTS

| 328,475 | 10/1885 | France | 301/5.3 |
|---|---|---|---|
| 2,262,714 | 11/1941 | Ware | 301/5.3 |
| 2,333,400 | 11/1943 | Ware | 301/5.7 |
| 2,345,258 | 3/1944 | Hirschmugl | 301/5.3 |
| 2,687,260 | 8/1954 | Morin | 264/328 |
| 2,720,681 | 10/1955 | Danielson et al. | 264/328 |
| 3,161,914 | 12/1964 | Bloomfield et al. | 264/171 |
| 3,592,510 | 7/1971 | Heitfield | 301/5.7 |
| 3,749,592 | 7/1973 | Gaske | 428/423 |
| 3,895,844 | 7/1975 | Merbler | 301/5.7 |
| 3,954,537 | 5/1976 | Alfter et al. | 156/306 |

OTHER PUBLICATIONS

Brydson, Plastics Materials, Van Nostrand, N.Y., (1966), pp. 488 & 489.
Modern Plastics Encyclopedia, 1948, Plastics Properties Chart.

*Primary Examiner*—Willard E. Hoag
*Attorney, Agent, or Firm*—Gausewitz, Carr & Rothenberg

[57] ABSTRACT

A method of making a skate wheel is formed of a transparent, high strength rigid core having a high degree of clarity, which firmly secures and positions a pair of inner bearing races. A transparent wear resistant resilient wheel casing is injection molded completely around the core. The materials are chosen and molded so as to provide an entirely transparent wheel that exhibits the color of the core and in which a display imprinted upon the sides of the core is protected by the casing and made readily visible by light transmitted through both core and casing.

9 Claims, 9 Drawing Figures

METHOD OF MOLDING A SKATE WHEEL HAVING A POLYESTER CORE AND A POLYURETHANE CASE AND THE PRODUCT THEREOF

This application is a continuation-in-part of application Ser. No. 566,792 filed Apr. 10, 1975, now abandoned for Two-Part Molded Skate Wheel.

BACKGROUND OF THE INVENTION

1. Field of the Invention

Wheels for many types of devices including wheels for roller skates, and particularly for skateboards, must be not only functional, durable and reliable, but, at least in part because of the nature of the purchasers and users of the skateboard, the wheels must be esthetically pleasing. The skateboard wheel, just as any other wheel, must have precision dimensional characteristics for good rolling motion. It must be durable, skid resistent, quiet, reliable and, preferably, inexpensive to manufacture. It is found, moreover, that the appearance of the wheel will significantly affect its marketability. Colored transparent wheels are highly desirable for certain uses. Nevertheless, it has not been possible heretofore to provide a transparent wheel with all of these desired characteristics.

2. Description of Prior Art

Good wear resistance and anti-skid characteristics are available from molded polyurethane wheels partly because of the resilient characteristics of this material. However, this very characteristic, the resilience, makes it difficult to provide an accurate wheel, one in which the wheel bearing and thus, the wheel axle, is firmly positioned and securely locked in place. Thus, it has been necessary in the past to provide a rigid washer between a pair of inner bearing races when molding an integral wheel of a material such as polyurethane. The use of the race retaining nylon washer in a cast wheel significantly adds to the time and expense of the manufacturing process. In some instances, such as described in U.S. Pat. No. 3,592,510 to Heitfield, it is attempted to hold the back-to-back bearing races in place by use of a casting material which shrinks upon curing. Such an arrangement is still dependent upon rigidity of the cast material for proper positioning of the wheel body with respect to the bearing races.

It has not been possible heretofore to achieve adequate dimensional precision in cast wheels, at least in part due to the very characteristic, the shrinkage of cured material, which the patentee Heitfield seeks to exploit. As the body of cast plastic cures, its originally cast surface configuration changes and outer surfaces, such as circumferential tread, for example, will tend to become concave, a configuration that is undesirable.

Another esthetic consideration of the skateboard wheel is the positioning of displays, printing, names, insignia or the like, upon the side of the wheel in bold, outstanding and easily visible patterns. In conventional wheel construction, such display patterns on the outside of the wheel are rapidly abraded and worn away and, moreover, are often difficult to see because of flat, angulated side surfaces.

The commonly used and desirable urethane plastic wheel is not transparent since this material in thicknesses required of a full wheel has relatively poor transparency. Further, it is relatively expensive and not readily adapted to provide different colors.

Accordingly, it is an object of the present invention to provide a molded wheel that eliminates or minimizes the above mentioned problems of prior wheels and provides a wheel that maximizes many desirable characteristics.

SUMMARY OF THE INVENTION

In carrying out principles of the present invention in accordance with a preferred embodiment thereof, a wheel core of a rigid, high strength material is molded about the wheel bearing parts to thereby position and lock the bearing parts within the wheel. A wheel casing is molded of an abrasion resistent resilient material to substantially completely encase the wheel core in close and intimate contact, extending integrally around and along both sides of the core. According to another feature of the invention, the bearing parts are integrally molded within a transparent, relatively rigid and high strength core that fixedly secures the bearing parts within the wheel. The core forms the bulk of the wheel, being considerably thicker than the casing and the latter may thus be less transparent without significantly degrading transparency of the wheel as a whole. Conveniently, a visual display is provided on one side of the core to be protected and encased by the wheel casing through which the display is readily visible in part by light transmitted through the core.

Another feature of the invention resides in the choice of a specific combination of an inner core material of high dimensional stability, strength, rigidity and hardness and a resilient wear resistent casing that will chemically bond or fuse together under molding conditions to thereby provide a much better bond therebetween than is available from mere mechanical interlocking.

DETAILED DESCRIPTION

Figure 1:
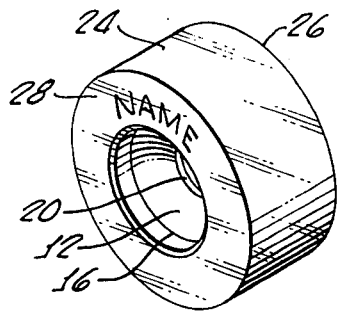
FIG. 1 is a perspective view of the core of a wheel embodying principles of the present invention.
Figure 2:
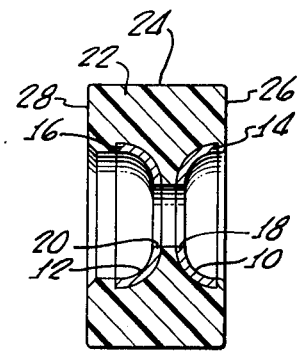
FIG. 2 is a section through the wheel core of FIG. 1.
Figure 3:
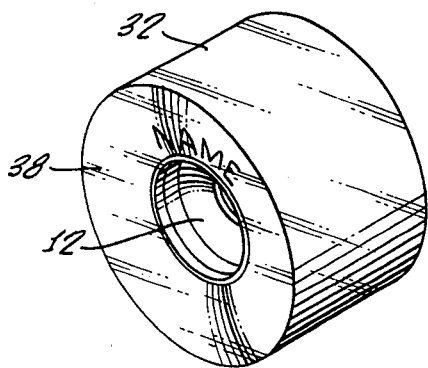
FIG. 3 is a perspective view of a completed wheel.

Referring now to FIGS. 1 and 2, a skate wheel includes a pair of conventional mutually opposed and mutually spaced inner bearing races 10 and 12 having outwardly facing annular lips 14, 16 and coaxial centrally positioned apertures 18, 20 for reception of a wheel axle (not shown). The races conventionally receive the wheel axle and a plurality of ball bearings which are retained in place against the outwardly facing surfaces of the races by conventional retaining devices mounted upon and threadedly positioned upon the wheel axle.

According to the present invention, the wheel races 10 and 12 are firmly positioned within a mold cavity upon a mandrel that extends through the central race apertures, the cavity defining a space having a shape identical to the shape of the core that is to be formed therein. Conventional injection molding techniques are employed to inject material of core 22 into the mold cavity. The mold material, injected at temperatures of about 425° F (218° C) and pressures in the neighborhood of 22,000 pounds per square inch, flows into intimate contact with the inner surfaces of the bearing races and the annular lips 14, 16, being kept from contact with the remainder of the races by the configuration of the mold cavity.

The molding time, including both injection and cure time, is but a few seconds and the integrally molded core and races are then removed from the mold for imprinting of a desired visual display or pattern thereon.

It will be noted that the core 22 is formed with a flat broad circumferential surface 24 and fist and second axially spaced and outwardly facing sides 26, 28 each of which, in the illustrated embodiment, extends in a plane normal to the wheel axis and has a relatively great extent as measured radially of the wheel. In a specific embodiment the total radial extent of each side (namely, the diameter of the core less the diameter of the race) is approximately one-half the diameter of the core and is nearly equal to one-half the diameter of the completed wheel. Thus, the sides 26, 28 provide a broad axially outwardly facing surface for reception of printing, display or other patterns as may be desired. The pattern may be impressed or printed upon the core side in any suitable fashion and with any suitable materials such as, for example, printing with conventional commercial links, hot stamped to impress colored foil or like material, or silk screened.

It is noted that a diametral plane positioned midway between the bearing races and extending normal to the wheel axis is closer to the core side 26 than it is to core side 28. The latter, in normal use of the wheel, faces outwardly of the skateboard whereas side 26 will normally face inwardly toward the corresponding wheel on the other end of the same wheel axle. Accordingly, it is upon this outwardly facing side 28 that the display is imprinted.

Figure 4:
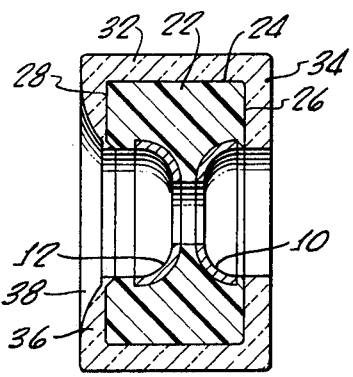
FIG. 4 is a section of the wheel of FIG. 3.

The integrally molded core and race assembly with the desired display imprinted thereon is then placed as an insert in a second mold, again having a mandril extending through the race apertures and suitable mold parts in contact with the outwardly facing surfaces of the race. The casing material is injected into the second mold cavity at pressures and temperatures as described above for the core injection. The casing thus provides an integral cover extending entirely over and fully encasing the core, including a circumferentially extending area portion 32, a first side portion 34 and a second side portion 36, all in close an intimate contact with the outer surface of the core 22. Casing sides 34 and 36 are substantially coextensive with the core sides, preferably extending for the full radial extent of the latter to afford optimum securement of the casing upon the core. The outwardly facing surface 38 of casing side 36 is formed with an outwardly convex (in the plane of the section of FIG. 4) surface that facilitates viewing and magnifies the image of the display material imprinted upon the core side 28.

The particular configuration employed insures that the casing, particularly a casing having a significant degree of resilience, will be firmly and securely locked upon the core. This locking action is enhanced by making the radial extent of the core sides relatively large and carrying the casing sides, such as sides 36 and 34, inwardly from the casing periphery toward the wheel axis for substantially the full extent of the core sides. This increases both the mechanical bond area of the casing and core interface and the mechanical locking surface of the casing sides upon the core. This mechanical and physical locking of the resilient casing upon the rigid core is of increased significance in a wheel, such as a skate wheel, which is normally subject to relatively large forces exerted laterally and in various other directions such as to tend to tear the casing from the core. However, the mechanical and physical lock is greatly enhanced by a chemical or fusion bonding between preferred materials to be described below.

In a preferred embodiment, the core is formed of a rigid high strength material having a high degree of clarity and a high degree of transparency. A preferred core material is butyrate 430-A-ORO-43-MS made by Eastman Chemical Corporation of Kingsport, Tenn. This material when molded has a high degree of transparency with great clarity and brilliance. It is available in almost any desired color. Amber has been employed. Eastman Chemical Corporation also supplies a TENITE Butyrate formula 433 suitable for use as a core in the described wheel. Butyrate is considerably less expensive than most materials commonly used for wear resistant casings. Although butyrate is preferred, other strong, rigid, clear and transparent materials having high dimensional stability and suitable for use as a core of the described skate wheel, include acrylics, resins, polycarbonate resins, and ABS (acrylonitrile-butadinestyrene copolymer). All of these materials have a high degree of transparency, which is required for certain aspects of the described invention. However, this butyrate is preferred for its fusion bonding to the casing material of the preferred embodiment as specified below.

The casing is preferably formed of a relatively resilient abrasion and wear resistant material having good frictional characteristics, tear and tensile strength, and, partly by virtue of its resilience, being relatively quiet. In a preferred embodiment, the material of the casing is a urethane elastoplastic polymer, preferably a polyester base polyurethane known as PELLETHANE 2102 series urethane elastomers, having an ASTMD-2240 Shore A Durometer hardness of 83±5, made by CPR Division of Upjohn Company of 555 Alaska Avenue, Torrance, Calif. 90503 specifically for injection molding.

The polyester base polyurethane for the casing in combination with butyrate for the core is preferred because, surprisingly and unexpectedly, it is found that these materials chemically bond or fuse to each other under conventional molding temperatures and pressures (as set forth herein). Although other materials, including those mentioned herein, will provide a physical and mechanical bond that is satisfactory for many purposes, many core materials other than butyrate will not fusion bond to polyurethane, and, further, it has not been found that butyrate will fusion bond to a polyurethane other than one of a polyester base, during the molding operation. It is postulated that portions of the surface of the butyrate core dissolve in the solvent of the polyester base polyurethane as the latter is injected in liquid form into the mold. This results in a surprising and unexpected improvement in the bond at the interface between core and case of the described wheels, since the materials appear to be fused together, after curing of the casing.

A number of significant results are achieved in the described invention by virtue of the use of two materials for the molded wheel and, more specifically, by virtue of the specific choice and cooperation of the two selected materials to provide optimum results.

The use of two materials and two molding steps decreases production time, decreases material costs and provides increased dimensional precision. Time of production is decreased because during each of the two molding steps the part molded is of relatively smaller mass and thus requires less time for cooling and curing. It is found that the total time required to cool each of the two smaller parts (the core in the first molding step and the casing molded about the core in the second molding step) is considerably less than that required to mold (and cure) the entire wheel as a single unit about the bearing races. Decrease in molding time, of course, enables a greater number of parts to be made per molding machine and thus equipment costs and overall costs are decreased.

Another reason for decrease in costs of the described wheel derives from the fact that material exhibiting the desired core characteristics is less expensive than material exhibiting the desired casing characteristics so that use of two different materials not only enables optimization of characteristics of the outer portion of the wheel and characteristics of the core, but also decreases cost of the materials.

Still another feature deriving from the use of two molded parts is the fact that plastic materials of the type commonly employed for molding of this type of article, shrinks or changes its dimensions upon curing as a relatively large molded mass cools and cures. Thus, its external surfaces tend to change configuration, often resulting in a wheel of the type having a somewhat concave outer peripheral surface, which is detrimental to wear in rolling operation.

The present invention attains precision of configuration and dimensional tolerances, due in part to the fact that when molded in two separate bodies or steps the size of neither part is large enough to exhibit any significant degree of shrinkage.

In addition to the above mentioned practical, economic and operational improvements of the described two-part molded wheel, its esthetics are greatly enhanced to thereby significantly improve marketability. Thus, in addition to its other desirable characteristics, the described core materials are available with a high degree of transparency, and are available in a number of colors so as to enable provision of a brilliant, clear and colored core. The polyurethane casing material has a considerably lesser degree of transparency and if it were to be molded as a solid wheel, such a solid body of polyurethane would have litle or no transparency and little translucency. However, when molded in relatively thin sections, the polyurethane has a sufficient transparency so as to enable a display imprinted upon the broad face of the core to be readily viewed by light transmitted through the core and thence through the casing.

The significant improvement in visibility of the display that derives from the transmission of light through the core, may be readily demonstrated. If the wheel outer circumference and the back face of the wheel are both covered, light can strike the display upon the core face 28 only by entering the wheel through the casing side 38. The display will be visible (when the wheel is covered at its back and circumference) solely by means of light reflected differentially from the display pattern and the side surface of the core face 28. It will be observed in such a condition, with light admitted only through the surface 38, that visibility of the display pattern is relatively poor. In contrast, with the periphery of the wheel casing and/or the backside of the wheel (casing side 34) uncovered to admit ambient light, light will pass through the casing periphery and backside and thence through the body of the clear core 22 and provide a back lighting of the display pattern which creates outstanding visibility of the pattern. Further, the display pattern appears to float deep within the body of the wheel, and, of course, is completely encased and protected by the casing side 36 so that it cannot be removed or worn off during operation.

A significant factor in the visibility of the display by means of the light transmitted through the core is the fact that the core and casing are chosen for mutual compatability, to provide an optimum close and intimate contact of the two at their interface, (the area of contact of the outer surface of core side 28 with the inner surface of casing side 36). If contact between these two surfaces is not close and intimate, air may be entrapped between these materials, creating a clouded layer of considerably degraded transparency. Such a clouded poorly transparent area greatly decreases the amount of back lighting and thus degrades visibility of the display. For a close and intimate contact, it is important that there be a good mechanical bond between the casing and the core. It is believed that the fusion bond described above further enhances this close and intimate contact. The good mechanical bond is achieved in the molding process by selection of materials having comparable softening temperatures. The fusion bond is achieved as described above.

As determined by the American Society of Testing Materials method VICAT test, polyurethane, such as the polyester base polyurethane, has a softening temperature in the neighborhood of 70° to 80° C and butyrate a softening temperature of about 70° C. Thus, when the polyurethane is injected into the mold containing the previously cured butyrate core, its relatively high mold temperature, about 218° C, and high injection pressure of about 20,000 pounds per square inch, causes a surface softening and, possibly a partial solution of the butyrate core in the polyurethane. This achieves a good mechanical and chemical or fusion bond of the polyurethane to the butyrate to thus achieve a close and intimate contact between the core and casing. This, in turn, provides optimized trnsmission of light through the bond interface.

Not only does the high clarity core enable improved visibility of a display thereon, but the color of the core imparts a color to the entire wheel. Thus to make wheels of different colors, it is only necessary to employ a core material of different colors, while retaining and employing the same casing material for the several different colored wheels.

It may be noted that the high transparency of the colored core affords a considerably brighter color to the entire wheel than would a similar colored core that is not transparent. In fact, color of a non-transparent core provides relatively little color to the overall wheel where a transparent or semi-transparent casing is employed. With a clear and transparent colored core, however, color of the latter will show even where the casing has considerably less transparency.

Dimensions of an exemplary wheel are basically as illustrated in the drawings. Obviously, these dimensions may be changed for other wheels and other wheel sizes as deemed necessary or desirable. The core of this typical wheel has a diameter of about 25/16ths of an inch and an axial length of about 14/16ths of an inch. The side of the core from its outer circumference to the inner edge of a near lip of one of the bearing races is bout 7/16ths of an inch. The casing is formed with a thickness throughout of about 3/16ths of an inch so that the casing diameter, the diameter of the finished wheel, is about 32/16ths and its width or axial length is about 19/16ths. The radial extent of the casing side, such as side 34, from the outer circumference to the casing side end adjacent the nearest lip of the race is about 9/16ths. The arrangement is such as to maximize the radial extent of the sides of the core, providing a maximized display pattern surface. The latter has a total radial extent that is nearly one-half the total diameter of the wheel. The core diameter is considerably greater than half the diameter of the wheel and thus it will be seen that the relative dimensions of the parts have been selected to maximize the advantages and improvements that flow from the selection of the particular combination of the core and casing materials.

Figure 5:
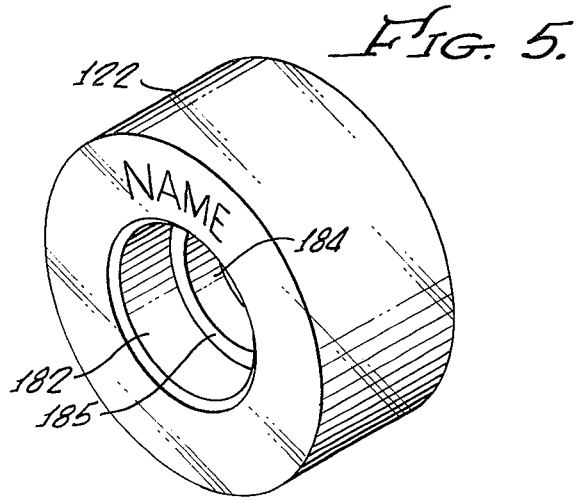
FIG. 5 is a perspective view of a second embodiment of the core of the wheel embodying principles of the present invention.
Figure 6:
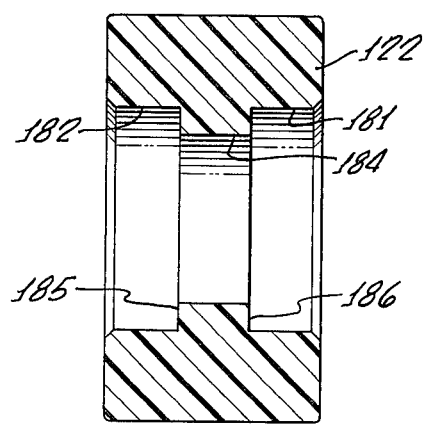
FIG. 6 is a section through the wheel core of FIG. 5.

Although the arrangement illustrated in FIGS. 1 through 4 is preferred because of economy and ease of manufacture, it is preferred in some wheels to employ what is known as a precision bearing which is a self-contained and permanently sealed bearing having closer tolerances of the bearing parts. Such a bearing is more quiet and cleaner and does not need to be periodically cleaned or lubricated, since it is sealed against entrance of dirt. The loose ball type of bearing, parts of which are illustrated in the drawings of FIGS. 1 through 4 and which employs the bearing races 10 and 12, is preferred in other situations since it is considerably cheaper, it may permit faster rotation of the wheels in which it is employed and it is easier to manufacture. Nevertheless, principles of the present invention are applicable to either type of bearing and a wheel embodying principles of this invention but employing the precision type bearing as illustrated in FIGS. 5 through 9. As shown in FIGS. 5 and 6, a core 122 is molded with first and second flat cylindrical cavities 181, 182 which are in part defined and spaced apart by a radially inwardly facing rib 184 that provides shoulders 185, 186 upon which a pair of precision bearings will seat when pressed into place. The core is molded without the bearings in place and in the configuration illustrated in FIGS. 5 and 6, but is otherwise substantially identical to core 22 of FIGS. 1 and 2.

Figure 7:
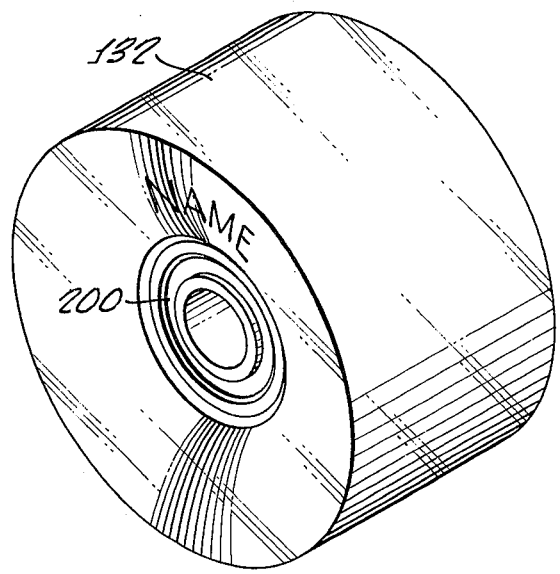
FIG. 7 is a perspective view of a completed wheel having the core of FIG. 5 therein.
Figure 8:
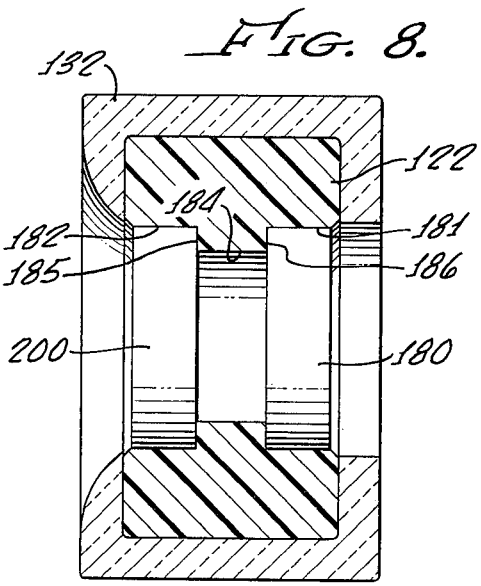
FIG. 8 is a section of the wheel of FIG. 7.
Figure 9:
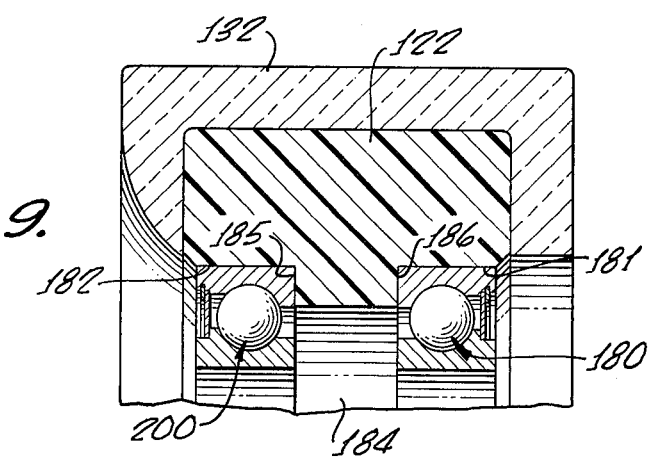
FIG. 9 is a section showing the self-contained precision bearing in the wheel of FIG. 7.

As in the arrangement of FIGS. 1 and 2, suitable printing or other display is affixed to an outer surface of the core for ready visibility through the casing that is later molded upon the core. After the molding of the core 122, and before any bearing or bearing parts are placed therein, a casing 132 is molded thereon to provide an assembly of core and casing as illustrated in FIGS. 7 and 8. Casing 132 is molded upon the core 122 just as the casing 32 is molded upon core 22 of FIGS. 1 through 4. Materials and molding conditions are the same as described in connection with FIGS 1 through 4.

After completion of the molding of the casing upon the core, a pair of self-contained and permanently sealed precision bearings 180 and 200, having both inner and outer races, are pressed into position to provide the finished wheel as illustrated in FIGS. 7 and 8. The cylindrical cavities 181 and 182 are made of such a size in the dimensionally stable and rigid butyrate core 122 that the self-contained bearings 180 and 200 may be forced into the cavities as a press fit therein and this press fit firmly and securely retains the bearings to and within the wheel. It will be readily observed that this mode of securing the bearings to the wheel, namely, simply pressing the bearings into a cavity formed in the wheel, cannot be employed with any degree of satisfaction in a wheel molded of solid polyurethane since the latter has too much resilience and lacks sufficient dimensional stability. The use of the hard, rigid and dimensionally stable butyrate for the core allows the self-contained precision bearings 180, 200 to be firmly pressed into the cavities formed in the butyrate and securely retained in place with a high dimensional stability, just as it allows the races 10, 12 to be securely retained.

The preferred polyurethane, Pellethane 2102, is provided as urethane elastoplastic polymer pellets for injection molding. This material is a thermoplastic polymer having high tensile and tear strength, high abrasion resistence, low compression set, low creep, excellent resistance to aliphatic hydrocarbons and retention of physical properties of both low and high temperatures. It has good damping capacity and high oxidation, heat and flex fatigue resistance. Physical properties include, shore A Durometer hardness of 83 ± 5, specific gravity of 1.8, tensile modulous at a 100% elongation of 800 psi and 1800 psi at 300% elongation, an ultimate tensile strength of 7,500 psi, ultimate elongation of 500% elongation set of 15%, a tear strength of 625 and a compression set of 25 to 30.

A preferred butyrate, such as the Tentite butyrate described above, is provided in pellets for molding and is available in many colors and degrees of transparency. A Tentite butyrate 433MS, for example has a flow temperature of 284° F, a specific gravity of 1.19, a Rockwell R scale hardness of 43, tensile strength at yield of 3,250 psi, tensile strength at fracture of 4,550 psi at 70° F, a flexural yield strength of 4,650 psi, a stiffness in flexure of $1.05 \times 10^5$ psi, an impact strength of 7.3 foot pounds per inch at 73° F, a deformation under load of 3% at 1,000 psi and 25% at 2,000 psi and at 122° F, a water absorption of 1.4% upon 24 hours emersion and a weight loss on heating at 180° F for 72 hours of 1.3%. The materials may include conventional plasticizers, anti-oxidants, and other common additives for such materials.

There has been described a wheel molded in two parts of materials selected for optimum characteristics of a wheel core and a wheel casing and further chosen so as to cooperate with each other to provide and enhance a number of significant desirable wheel characteristics.

The foregoing detailed description is to be clearly understood as given by way of illustration and example only, the spirit and scope of this invention being limited solely by the appended claims.

What is claimed is:

1. The method of molding a precision low cost wheel comprising the steps of
    molding a wheel core of butyrate polymer about wheel bearing parts to thereby position and lock said bearing parts within said wheel core, and molding a wheel casing of polyester polyurethane to substantially completely encase said core in close and intimate contact therewith and fusion bonding said core and casing together around the circumference of the core and inwardly along both sides of said core from the outermost circumference of said wheel toward the axis of said wheel, thereby to firmly and securely lock said casing to said core.

2. The method of claim 1 wherein said core material has a high degree of transparency and a melting point such that the surface thereof softens upon contact with the casing material during injection thereof.

3. A wheel made by the method of claim 1.

4. The method of molding a wheel comprising the steps of molding a wheel core of a transparent, rigid, high strength butyrate polymer about wheel bearing parts to thereby position and lock said bearing parts within said wheel and to provide a transparent core with at least one end extending from the periphery of the core toward the wheel axis, forming a visual display upon said core end, and molding a wheel casing of a transparent, abrasion resistant, resilient polyester polyurethane in close intimate contact with said core to extend around the circumference of said core and fusion bonding said core and casing together over said core end and over said visual display, said casing being molded over said core end with a thickness less than the thickness of said core, whereby said display upon said core side is visible at least in part by means of light transmitted through said core.

5. A wheel made by the method of claim 4.

6. The method of molding a precision low cost wheel comprising the steps of molding a wheel core of butyrate polymer, and molding a wheel casing of polyester polyurethane to substantially completely encase said core in close and intimate contact therewith and fusion bonding said core and casing together to extend integrally around the circumference of the core and inwardly along both sides of said core from the outermost circumference of said wheel toward the axis of said wheel, thereby to firmly and securely lock said casing to said core.

7. The method of claim 6 wherein said core material has a melting point such that the surface thereof softens upon contact with the casing material during molding.

8. A wheel made by the method of claim 6.

9. A molded wheel comprising, a rigid high strength wheel core of butyrate polymer, and a resilient, abrasion resistant casing of polyester polyurethane molded on and about said core and fusion bonded to said core.

* * * * *

UNITED STATES PATENT AND TRADEMARK OFFICE
CERTIFICATE OF CORRECTION

PATENT NO. : 4,040,670
DATED : August 9, 1977
INVENTOR(S) : Maurice Charles Williams It is certified that error appears in the above-identified patent and that said Letters Patent are hereby corrected as shown below:

Col. 3, line 15:   Change "fist" to ---first---.

Col. 3, line 46:   Change "race" to ---races---.

Col. 3, line 51:   Change "area" to ---tread---.

Col. 3, line 52:   Change "an" to ---and---.

Col. 5, line 54:   Change "litle" to ---little---.

Col. 6, line 49:   Change "trnsmission" to ---transmission---.

Col. 7, line 7:    Change "bout" to ---about---.

Signed and Sealed this

Tenth Day of January 1978

[SEAL]

Attest:

RUTH C. MASON
Attesting Officer

LUTRELLE F. PARKER
Acting Commissioner of Patents and Trademarks

UNITED STATES PATENT AND TRADEMARK OFFICE
CERTIFICATE OF CORRECTION

PATENT NO. : 4,040,670
DATED : August 9, 1977
INVENTOR(S) : Maurice Charles Williams It is certified that error appears in the above-identified patent and that said Letters Patent are hereby corrected as shown below:

Title page and
col. 1, lines 1-4: Change title of invention from "Method of Molding A Skate Wheel Having A Polyester Core And A Polyurethane Case And The Product Thereof" to read ---Method of Molding A Skate Wheel Having a Butyrate Core And A Polyurethane Case And The Product Thereof---.

Signed and Sealed this

Thirtieth Day of May 1978

[SEAL]

Attest:

RUTH C. MASON
Attesting Officer

LUTRELLE F. PARKER
Acting Commissioner of Patents and Trademarks